Feb. 28, 1933.  C. A. FREY  1,899,564

LAWN MOWER

Filed Dec. 24, 1928

INVENTOR.
Charles A. Frey.
BY Thorpe&Thorpe
ATTORNEYS.

Patented Feb. 28, 1933

1,899,564

UNITED STATES PATENT OFFICE

CHARLES A. FREY, OF KANSAS CITY, MISSOURI

LAWN MOWER

Application filed December 24, 1928. Serial No. 328,207.

This invention relates to power lawn mowers and is especially adapted for use in combination with an electric motor, one of the objects of the invention being to produce a mower of this general class equipped with a housing whereby the operator is protected against injury by pieces of the blade, should the blade break by accidental contact with an obstruction.

Some of the other objects of the invention are to produce a housing of such design that the severed grass will be immediately discharged and will not tend to ball or pack up within the housing and interfere with the proper operation of the cutting blade; to provide means whereby the grass will be lifted into a vertical position so that the action of the cutting blade will be facilitated; to provide a mower of the general class outlined with a new type of cutting blade which has been found especially advantageous in a mower of this type; and to provide a mower with a handle which may be quickly and easily adjusted to suit the height of the operator of the machine.

With the general objects named in view and others as will hereinafter appear, the invention consists in certain novel and useful features of construction and combination of parts as hereinafter described and claimed; and in order that it may be fully understood, reference is to be had to the accompanying drawing, in which:

Figure 1:
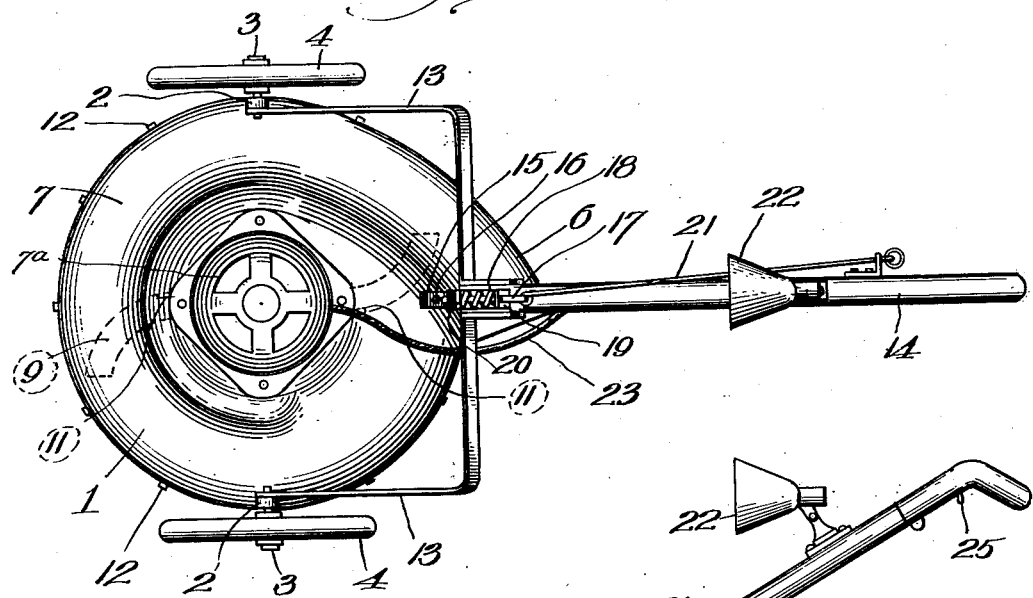
Figure 1 is a top plan view of a lawn mower embodying the invention.
Figure 2:
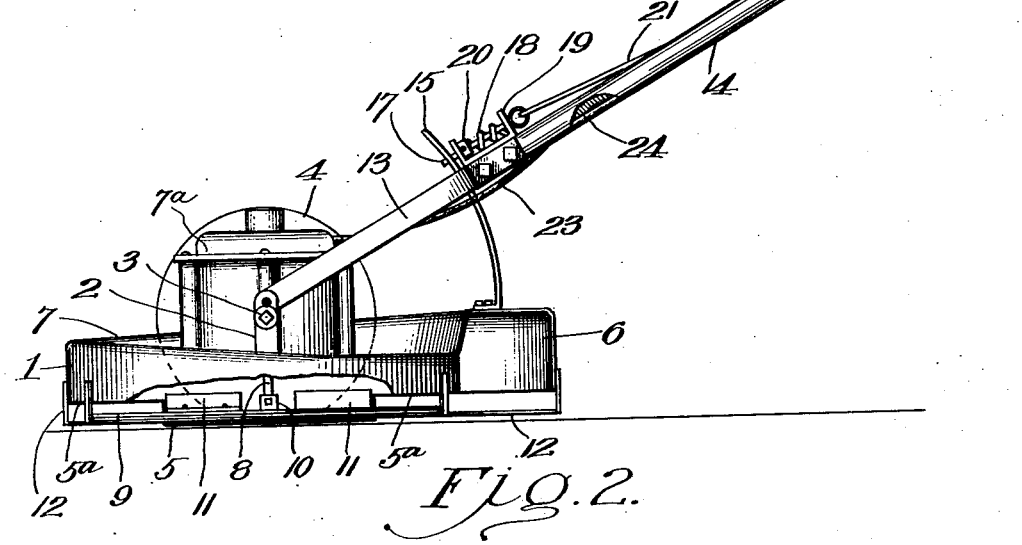
Figure 2 is a side elevation with one wheel removed and partly broken away to illustrate parts otherwise hidden.

In the said drawing, where like reference characters identify corresponding parts in all of the figures, 1 indicates a relatively cylindrical housing open at its lower end to provide an inlet opening and at its closed top being formed integrally with a pair of diametrically disposed vertical brackets 2, said brackets, some distance below their upper ends being provided with stub axles or shafts 3 on which supporting wheels 4 are journaled.

The lower edge of the housing 1 between the wheels 4 is formed with a downwardly-extending skirt or flange portion 5 terminating just short of the ground line, and forwardly and rearwardly of said portions the skirt is shorter as at $5^a$ so that the machine will not press the grass down as it progresses over a lawn. The housing 1 is formed with a tangential discharge opening 6, said housing gradually reducing in height from the mouth of the discharge opening in spiral form, as indicated at 7. The increased height of the housing provides a duct through which the grass severed by the blade, hereinafter identified, may be readily discharged without tending to pile or ball up within the housing and interfere with the cutting operation.

Mounted on the housing 1 and in axial alinement with the center thereof is an electric motor $7^a$ which may, if desired, be provided with its own housing, said motor having a shaft 8 projecting into the open bottom of the housing 1 and terminating some distance above the ground line. Mounted on the end of said shaft is a cutting blade 9 of S-shape, equipped with a set screw 10 whereby it may be vertically adjusted to suit the height it is desired to sever the grass. It has been found that with a mower of this type in which there is no cutter bar, the S-shaped blade 9 greatly exaggerates the drawing cut, and thereby imparts a greater cutting efficiency to the machine. From the above description, it will be apparent that when the blade 9 is rapidly rotated, it will efficiently and evenly sever the grass according to its adjusted height.

In order to effect the lifting of the grass to a vertical position for contact with the cutting blade 9 and the better discharge of such severed grass, this blade is provided with a pair of fan blades or impellers 11, which produce a suction to lift the grass blades and by the draft of air created, and with the assistance of centrifugal force, discharge the severed grass outwardly through tangential discharge opening 6. To guard against the operator accidentally rocking the machine to such a degree that the blade 9 might contact with an obstruction and lead to the injury of the blade and fan, the inlet opening is bridged by a series of guard wires or straps 12 extending parallel to the direction of travel of the machine.

The brackets 2, besides supporting the axles 3 also form points to which a pair of propelling brackets 13 are fulcrumed, said brackets being centrally joined by an operating handle 14. Mounted on the top of the casing is an adjusting quadrant 15 having a series of holes 16 for engagement with a locking rod 17 held in advanced position by a spring 18 mounted on the handle 14 between the opposite ends of a supporting bracket 19, one end of the spring pressing against a collar 20 pinned to the locking rod. The locking rod is controlled by means of a rod 21 slidably mounted at its upper end adjacent the handle and in convenient position for operation by the operator of the lawn mower. If desired, the handle 14 may be provided with an electric light 22 so that the machine may be operated at night.

The power lead for the motor is indicated at 23, the underside of the handle being recessed as at 24 to receive said cable, a control switch 25 for the current being conveniently located adjacent the upper end of the operating handle 14.

From the above description it will be apparent that I have produced a power lawn motor possessing the features of advantage set forth as desirable in the statement of the objects of the invention, and which is susceptible of modification in various particulars within the principle of construction involved and the spirit and scope of the appended claims.

I claim:

1. In a lawn mower, including a support and a blade rotatably carried by the support, a housing having a bottom inlet and an outlet disposed in substantially the horizontal plane and tangentially of the rotating blade, and means for operating said blade.

2. In a lawn mower having a housing provided with a bottom inlet and a tangential outlet opening, a motor, a motor shaft, a grass cutting blade mounted on said shaft in substantially the horizontal plane of the outlet opening, and means for discharging severed grass through the outlet opening.

3. A lawn mower having a housing provided with a bottom inlet and a tangential outlet, a motor, a motor shaft, a cutting blade on said shaft in substantially the horizontal plane of the outlet opening, and means for effecting adjustment of said cutting blade with respect to the inlet opening.

4. In a lawn mower including a support and a blade rotatably carried by the support, a housing having a bottom inlet and an outlet disposed in substantially the horizontal plane and tangentially of the rotating blade, means for operating said blade, and an impeller adapted to discharge through said tangential outlet.

5. A lawn mower having a housing provided with a bottom inlet and a tangential outlet opening, a motor, a motor shaft, a cutting blade mounted on said shaft in substantially the horizontal plane of the outlet opening, and an impeller adapted to discharge through said tangential outlet.

6. A lawn mower having a housing provided with a bottom inlet and a tangential outlet, a motor, a motor shaft, a cutting blade mounted on said shaft, means for effecting adjustment of said cutting blade with respect to the inlet opening, and an impeller in substantially the horizontal plane of and being adapted to discharge through said tangential discharge opening.

7. A lawn mower comprising a rotatable cutting blade, and a housing for said blade, said housing being of generally circular form and having a tangential discharge opening, the height of the housing gradually reducing from said discharge opening in spiral form.

8. A lawn mower comprising a rotatable cutting blade, a housing for said blade, said housing being of generally circular form and having a tangential discharge opening, the height of the housing gradually reducing from said discharge opening in spiral form, and an impeller in said housing for discharging through said discharge opening.

9. A lawn mower comprising a rotatable cutting blade of S-shape, a housing for said blade, said housing being of generally circular form and having a tangential discharge opening, the height of the housing gradually reducing from said discharge opening in spiral form, and an impeller in said housing for discharging through said discharge opening.

10. A lawn mower comprising a rotatable cutting blade, a housing for said blade, a pair of wheels supporting the housing, said housing being of generally circular form and having a tangential discharge opening, the height of the housing gradually reducing from said discharge opening in spiral form, an impeller in said housing for discharging through said discharge opening, and a handle adjustably secured to said housing.

11. In a lawn mower, a rotating cutting blade, a housing of generally circular form at its lower end enclosing said blade, a wheeled support for said housing, driving connections for said rotating cutting blade, and a series of guards bridging the open bottom of said housing.

12. In a lawn mower, a rotating cutting blade, a housing of generally circular form at its lower end enclosing said blade, a wheeled support for said housing, the lower edge of said housing at its opposite sides and in a plane transverse of the direction of movement of the wheeled support extending to a plane below that of the front and rear lower edges of said housing, driving mechanism to rotate said cutting blade, and a series of guards bridging the open bottom of said housing.

In testimony whereof I affix my signature.

CHARLES A. FREY.